Nov. 5, 1929.  S. TALISMAN  1,734,653

PAPER CLIP

Filed April 18, 1928

Inventor
Samuel Talisman

Patented Nov. 5, 1929

1,734,653

UNITED STATES PATENT OFFICE

SAMUEL TALISMAN, OF SAN BERNARDINO, CALIFORNIA

PAPER CLIP

Application filed April 18, 1928. Serial No. 271,083.

This invention relates to paper clips and has for its object to provide a pin clip or clamp so formed that while the paper is pierced only once by the pin it will nevertheless be held firmly and securely together.

Another object of the invention is to provide a pin clip so formed that papers secured thereby will be held perfectly flat and devoid of buckling such as is usually the case where a number of papers are pinned together.

A further object of the invention is to provide a pin clip in which the pin shank is bent upon itself the pin having a sinuous head adapted to coact with the shank upon which it lies to form a spring clip between which papers may be securely held.

With the above and such other objects in view as may hereinafter more fully appear, I have invented the device shown in the accompanying drawings in which.

Figure 1:
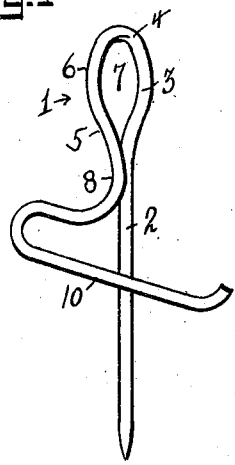
Figure 1 is a perspective view of one form of my invention.

Like reference characters indicate like parts throughout the following specification, and in the several views in the drawings in which 1 indicates a pin clip for securing a number of sheets of paper together and so formed that the papers are pierced only once by the pin, and are held perfectly flat and securely clamped together. The clip consists of a shank 2, having a slightly offset portion 3, and directly there-above bent at 4 and returned upon itself as at 5, the returned portion having an offset 6 directly opposite the offset 3, to form a loop 7, directly below which is a slight hump 8, normally bearing against the shank portion 2. The portion 2 terminates at its lower end in a pin point 9. The shank portion 12 terminates at its lower end in a sickle shaped cross head 10 adapted to form a secure grip upon the paper and hold the same clamped to the shank 2.

Figure 2:
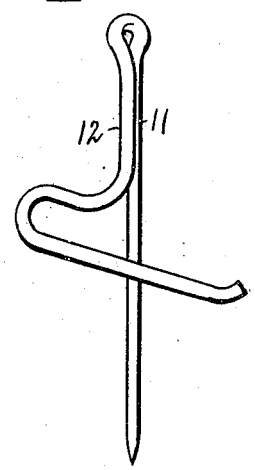
Figure 2 is a similar view of another form of the device.

In Figure 2 I show a slight modification in which the shank portions 11 and 12 are bent flat upon themselves eliminating the loop provided in the larger clip of Figure 1.

Figure 3:
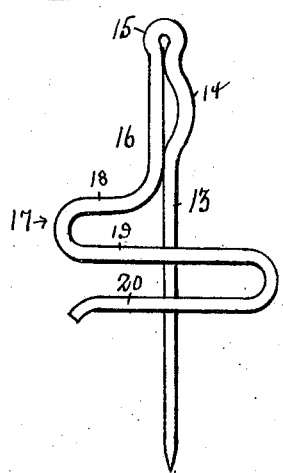
Figure 3 is a plan view of another modification.
Figure 4:
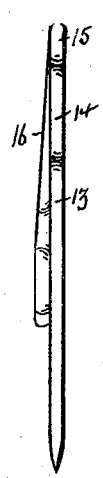
Figure 4 is an edge view thereof.
Figure 5:
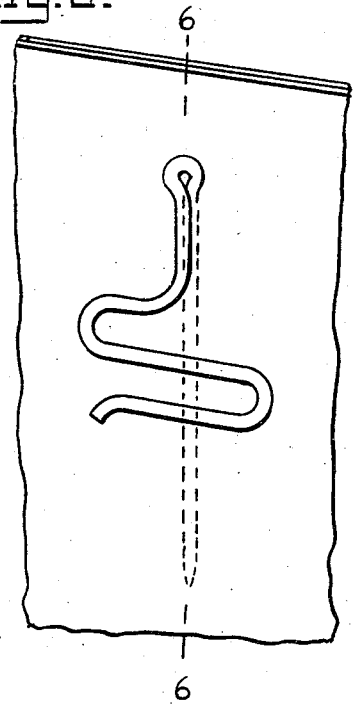
Figure 5 is a plan view of another modification shown in operation.

In Figure 3 I show a modification in which the shank portion 13 is provided with an outbent part 14 above which the shank is bent upon itself as at 15, and the returned shank portion 16 run straight until the S-shaped head 17 is reached, the head crossing the shank 13 at the separate spaced apart horizontal planes 19 and 20.

Figure 6:
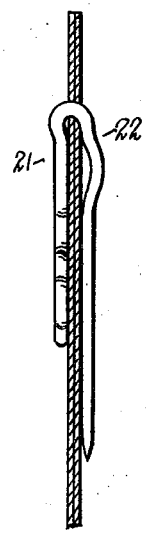
Figure 6 is a section on line 6—6 of Figure 5.

In Figure 6 the form of the clip 21 is in all respects similar to that of Figure 1, except the head 22, is formed S-shaped as in Figure 3.

Having described my invention that which I claim to be new and desire to procure by Letters Patent is:

1. In a paper clip a shank pointed at one end and terminating in an eye at the other end, an extension from said eye terminating in a cross head member, bearing centrally upon said shank, said extension paralleling said shank, and bearing thereupon, a loop formed between said shank and said extension intermediate said eye and cross head.

2. The combination defined in claim 1, said cross head being S-shaped.

In testimony whereof I affix my signature.

SAMUEL TALISMAN.